US007770758B2

(12) United States Patent
Le Maner

(10) Patent No.: US 7,770,758 B2
(45) Date of Patent: Aug. 10, 2010

(54) ELEMENT FOR FIXING A FLUID PRODUCT DISPENSING MEMBER AND FLUID PRODUCT DISPENSING MEMBER COMPRISING SAME

(75) Inventor: François Le Maner, La Vallée Montaure (FR)

(73) Assignee: Valois S.A.S, Le Neubourg (FR)

( * ) Notice: Subject to any disclaimer, the term of this patent is extended or adjusted under 35 U.S.C. 154(b) by 891 days.

(21) Appl. No.: 10/532,088

(22) PCT Filed: Oct. 24, 2003

(86) PCT No.: PCT/FR03/03157

§ 371 (c)(1),
(2), (4) Date: Nov. 2, 2005

(87) PCT Pub. No.: WO2004/039504

PCT Pub. Date: May 13, 2004

(65) Prior Publication Data

US 2006/0081654 A1 Apr. 20, 2006

(30) Foreign Application Priority Data

Oct. 28, 2002 (FR) .................................. 02 13471

(51) Int. Cl.
*B65D 88/54* (2006.01)
*F16L 21/06* (2006.01)

(52) U.S. Cl. ................. 222/321.1; 222/321.6; 220/315; 285/322; 403/329; 403/122

(58) Field of Classification Search .............. 222/321.1, 222/321.2, 321.3, 321.4, 321.5, 321.6, 321.7, 222/321.8, 321.9; 220/315, 780; 215/317; 285/921, 322, 243; 403/329, 122–144
See application file for complete search history.

(56) References Cited

U.S. PATENT DOCUMENTS

| | | | | | |
|---|---|---|---|---|---|
| 3,065,002 | A | * | 11/1962 | Waalkes et al. | 285/315 |
| 4,121,844 | A | * | 10/1978 | Nemoto et al. | 277/635 |
| 4,462,620 | A | * | 7/1984 | Bambenek et al. | 285/140.1 |
| 4,501,360 | A | * | 2/1985 | Levy et al. | 206/443 |
| 4,511,164 | A | * | 4/1985 | Orchard | 285/252 |
| 5,593,187 | A | * | 1/1997 | Okuda et al. | 285/305 |
| 5,979,946 | A | * | 11/1999 | Petersen et al. | 285/305 |
| 6,000,729 | A | * | 12/1999 | Williamson et al. | 285/242 |
| 6,021,924 | A | * | 2/2000 | Suck et al. | 222/105 |

FOREIGN PATENT DOCUMENTS

| | | | |
|---|---|---|---|
| EP | 0 810 036 | A | 12/1997 |
| GB | 857 189 | A | 12/1960 |
| JP | S53-088443 | U | 7/1978 |
| JP | H02-073141 | U | 6/1990 |
| JP | H06-191571 | A | 7/1994 |
| JP | H08-207947 | A | 8/1996 |
| JP | 2002-205750 | A | 7/2002 |

* cited by examiner

*Primary Examiner*—Kevin P Shaver
*Assistant Examiner*—Stephanie E Tyler
(74) *Attorney, Agent, or Firm*—Sughrue Mion, PLLC

(57) ABSTRACT

A fastener element for fastening a fluid dispenser member, such as a pump or a valve, on a fluid reservoir, the fastener element including a deformable snap-fastener portion for snap-fastening on the neck of the reservoir, the snap-fastener portion including a stiffener insert for substantially preventing the snap-fastener portion from deforming after snap-fastening.

22 Claims, 1 Drawing Sheet

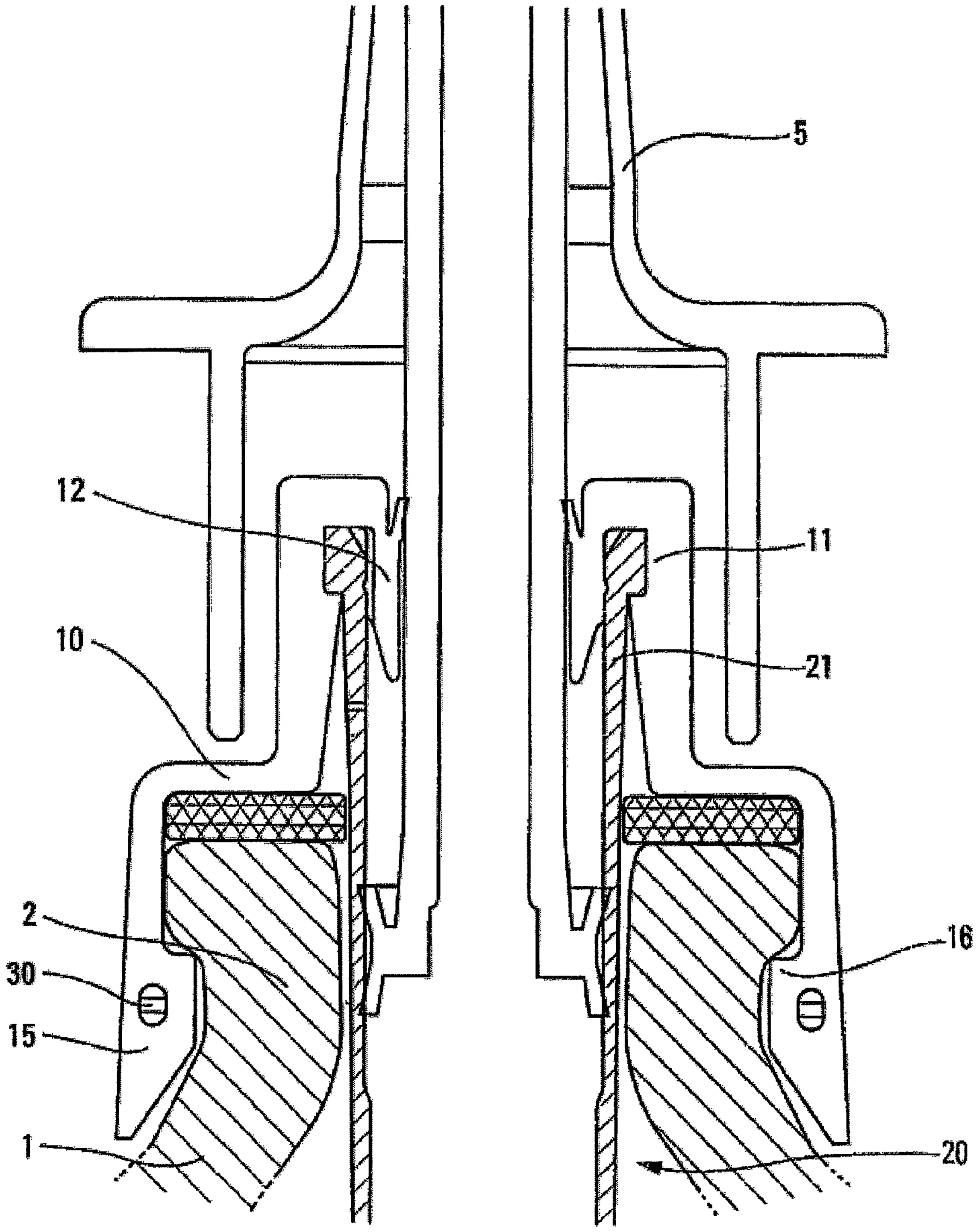
Only Figure

ELEMENT FOR FIXING A FLUID PRODUCT DISPENSING MEMBER AND FLUID PRODUCT DISPENSING MEMBER COMPRISING SAME

The present invention relates to a fastener element for fastening a dispenser member on a reservoir, and to a fluid dispenser device including such a fastener element.

In order to fasten a pump or a valve on the neck of a reservoir, it is well known to use a fastener element, such as a fastener ring. Such fastener rings can be of any kind, and clampable, screw-fastenable, or snap-fastenable rings are known in particular. When a snap-fastenable ring is used, said ring generally includes deformable snap-fastener means which move apart during assembly so as then to become resiliently snap-fastened below the neck of the reservoir. The snap-fastener means must therefore be sufficiently flexible to make snap-fastening possible. In a first variant, snap-fastener tabs are provided, and it is thus generally necessary to have a band around the ring, and in particular around said tabs, so that after snap-fastening, said tabs are prevented from moving apart once again, which would make the fastening too easy to remove. In another variant, the ring includes a lateral skirt that is generally provided with a snap-fastener flange, said skirt and/or said flange being deformed until the flange becomes snap-fastened below the neck of the reservoir. Once again, said snap-fastener portion must be deformable to enable snap-fastening to be achieved. The flexibility or resilience of the snap-fastener portion also makes the fastening unreliable in the absence of a covering piece, such as a band surrounding said ring.

An object of the present invention is to provide a fastener element for fastening a fluid dispenser member on a reservoir, while not having the above-mentioned drawbacks.

More particularly, an object of the present invention is to provide a snap-fastenable fastener ring which provides a fastening that is safe and substantially permanent, even without the use of an outer covering piece, such as a band.

Another object of the present invention is to provide such a fastener element which is simple and inexpensive to manufacture and to assemble.

Another object of the present invention is to provide a fluid dispenser device including such a fastener element.

The present invention thus provides a fastener element for fastening a fluid dispenser member, such as a pump or a valve, on a fluid reservoir, said fastener element including a deformable snap-fastener portion for snap-fastening on the neck of the reservoir, said fastener element being characterized in that said snap-fastener portion includes stiffener means for substantially preventing said snap-fastener portion from deforming after snap-fastening.

Advantageously, said snap-fastener portion comprises a lateral skirt of said fastener element, and a projection projecting radially inwards from the inside wall of said lateral skirt.

Advantageously, said stiffener means are inserted, integrated, sunk, and/or embedded in said snap-fastener portion.

Advantageously, said stiffener means comprise one or a plurality of rigid and/or resilient elements.

Advantageously, the rigid and/or resilient element(s) extend in or around the periphery of the snap-fastener portion.

Advantageously, said stiffener means comprise at least one substantially rigid and/or resilient circular insert.

Advantageously, the inside diameter of said at least one circular insert is not less than the outside diameter of the neck of the reservoir.

In a first embodiment, said circular insert is made as a single part.

In a second embodiment, said circular insert is constituted by a plurality of insert sections.

Advantageously, said circular insert is a metal wire or the like.

Advantageously, said wire includes a plurality of turns.

Advantageously, said fastener element is a snap-fastenable ring for fastening a pump on a neck of a reservoir, said ring being made integrally with pump-receiver means co-operating with the pump body, and a ferrule portion extending inside said pump body so as to define the rest position of the pump.

Advantageously, said snap-fastenable ring is made from a single plastics material.

In a variant, said snap-fastenable ring is made from a plurality of different plastics materials.

The present invention also provides a fluid dispenser device, including a dispenser member, such as a pump or a valve, mounted on a fluid reservoir by means of a fastener element, said fastener element being made as described above.

Other characteristics and advantages of the present invention appear more clearly from the following detailed description, given by way of non-limiting example, and with reference to the accompanying drawing, and in which the sole FIGURE shows a fluid dispenser device including a fastener element constituting an advantageous embodiment of the present invention.

The FIGURE shows a reservoir 1 containing a fluid to be dispensed, the reservoir being provided with a neck 2. A fluid dispenser member 20, which can be a pump or a valve, is assembled on the reservoir by means of a fastener element 10, in this case a snap-fastenable fastener ring. A dispenser head or push-button 5 is assembled on the dispenser member (which is a pump in the FIGURE, and which is designated as such below). In particular, the push-button 5 serves to actuate the pump so as to dispense a dose of fluid.

The fastener ring 10 includes a deformable snap-fastener portion 15 for snap-fastening on the neck 2 of the reservoir. The snap-fastener portion 15 is preferably formed by the lateral skirt of the ring 10, and is provided with a radial projection 16 on its inside lateral surface.

The radial projection 16 can form a continuous circular snap-fastener profile extending all around said lateral skirt 15 of the fastener ring, but it is also possible to envisage providing only snap-fastener lugs 16 that are circumferentially separated from each other, but distributed around the entire inner periphery of said ring at said snap-fastener portion 15.

During assembly, an axial force is exerted on the fastener ring 10 which becomes deformed at its inner radial projections 16, said projections moving apart so as to pass over the neck 2 of the reservoir and become engaged below said neck, as shown in the FIGURE. The snap-fastener portion 15 of the fastener ring 10 is thus preferably made of a deformable material so as to make said snap-fastening possible.

In the invention, the snap-fastener portion 15 of the ring 10 includes stiffener means 30 for substantially preventing said snap-fastener portion 15 from deforming once the ring 10 has been assembled on the neck of the reservoir. As shown in the FIGURE, the stiffener means are preferably inserted, integrated, sunk, or embedded in said snap-fastener portion 15. In an advantageous embodiment, the stiffener means 30 are formed by a substantially rigid and/or resilient circular insert which extends inside the snap-fastener portion 15, at said inner radial projection 16. The circular insert can be continuous, or in a variant, can be formed by insert sections that are circumferentially disposed one after the other. The purpose of such rigid and/or resilient elements or inserts 30 is to prevent the snap-fastener portion 15 from deforming after snap-fastening, so as to ensure that said ring remains fastened on the neck of the reservoir.

The stiffener means can preferably be formed by a metal wire or by a filament of any other material that is stiffer than the material constituting the ring. The wire can extend over the entire periphery, inside said snap-fastener portion 15 of the ring 10. It can also be constituted by a plurality of turns. The inside diameter of said insert is preferably at least equal to, or even slightly greater than, the outside diameter of the neck 2 of the reservoir 1, so that the presence of said insert 30 does not prevent the projection 16 from deforming during snap-fastening. Several variants can be envisaged. The insert 30 can thus be completely rigid. It can also be slightly deformable so as to make it easier to snap-fasten the ring 10. It can also be resilient, and return resiliency to its initial position after snap-fastening. The insert 30 must essentially stiffen the snap-fastener portion 15, so as to improve fastening after assembly.

As shown in the FIGURE, the fastener ring 10 can be made as a single piece with a receiver portion 11 for receiving the pump body 21, the pump body 21 being fastened in said receiver portion 11. The receiver portion 11 is generally designated by the term "turret". The turret can itself be extended inside the pump body 21 by a ferrule portion 12, generally used to define the rest position of the pump, the ferrule 12 co-operating with the piston or with an element secured to said piston. In the embodiment selected, the ferrule can include relatively flexible portions so as to provide sealing with the actuator rod connected to the piston of the pump. Thus, when such a fastener ring is made as a single part from a single plastics material, it is necessary to use a relatively flexible plastics material to enable the ferrule to fulfill its sealing function with the actuator rod. Naturally, in this case, the snap-fastener portion 15 is also made with said relatively flexible material, and the presence of the stiffener insert 30 makes it possible to prevent the fastener ring from coming out of its snap-fastened position too easily.

However, it should be observed that the present invention applies equally well to fastener rings made from a plurality of different plastics materials, e.g. rings made of two materials, including a relatively flexible material for the ferrule, and another, more rigid material for the turret and/or for the snap-fastener portion.

More generally, the embodiment shown in the sole FIGURE is given by way of non-limiting example only, and any modifications could naturally be applied thereto by a person skilled in the art, without going beyond the ambit of the present invention as defined by the accompanying claims.

The invention claimed is:

1. A fastener element for fastening a fluid dispenser member on a fluid reservoir, said fastener element including a deformable snap-fastener portion for snap-fastening on a neck of the reservoir, wherein a stiffener member is provided inside said deformable snap-fastener portion for substantially preventing said deformable snap-fastener portion from deforming after snap-fastening; and wherein the deformable snap-fastener portion comprises a lateral skirt of said fastener element, and a projection projecting radially inwards from an inside wall of said lateral skirt.

2. A fastener element according to claim 1, in which said stiffener member is inserted, integrated, sunk, or embedded inside said deformable snap-fastener portion.

3. A fastener element according to claim 1, in which said stiffener member comprises one or a plurality of rigid and/or resilient elements.

4. A fastener element according to claim 3, in which the rigid and/or resilient element(s) extend in or around the periphery of the deformable snap-fastener portion.

5. A fastener element according to claim 1, in which said stiffener member comprises at least one substantially rigid and/or resilient circular insert.

6. A fastener element according to claim 5, in which the inside diameter of said at least one circular insert is not less than the outside diameter of the neck of the reservoir.

7. A fastener element according to claim 5, in which said circular insert is made as a single part.

8. A fastener element according to claim 5, in which said circular insert is constituted by a plurality of insert sections.

9. A fastener element according to claim 5, in which said circular insert is a metal wire.

10. A fastener element according to claim 9, in which said wire includes a plurality of turns.

11. A fastener element according to claim 1, in which said fastener element is a snap-fastenable ring for fastening a pump on a neck of a reservoir, said ring being made integrally with pump-receiver means co-operating with the pump body, and a ferrule portion extending inside said pump body so as to define the rest position of the pump.

12. A fastener element according to claim 11, in which said snap-fastenable ring is made from a single plastics material.

13. A fastener element according to claim 11, in which said snap-fastenable ring is made from a plurality of different plastics materials.

14. A fluid dispenser device, including a dispenser member, mounted on a fluid reservoir by a fastener element, wherein said fastener element is made according to claim 1.

15. A fastener element according to claim 1, wherein the fluid dispenser member is a pump or a valve.

16. A fluid dispenser device according to claim 14, wherein the dispenser member is a pump or a valve.

17. A fastener element for fastening a fluid dispenser member on a fluid reservoir, said fastener element comprising a deformable snap-fastener portion that snap-fastens onto a neck of the reservoir, the fastener element comprising a resilient or rigid stiffener element inside the snap-fastener portion that substantially prevents the snap-fastener portion from deforming after snap-fastening;

wherein the deformable snap-fastener portion comprises a lateral skirt of said fastener element, and a projection projecting radially inwards from an inside wall of said lateral skirt.

18. The fastener element according to claim 17, wherein the stiffener element is inserted or embedded inside the deformable snap-fastener portion.

19. A fastener element according to claim 1, wherein the deformable snap-fastener portion is configured to be located outside the neck of the reservoir and below an annular protrusion of the neck of the reservoir when the fastener element is fastened on the fluid reservoir.

20. A fastener element according to claim 1, wherein the stiffener member inside the deformable snap-fastener portion is configured to be located outside the neck of the reservoir and below an annular protrusion of the neck of the reservoir when the fastener element is fastened on the fluid reservoir.

21. A fastener element according to claim 1, wherein the stiffener member is embedded inside the deformable snap-fastener portion.

22. A fastener element for fastening a fluid dispenser member on a fluid reservoir, said fastener element including a deformable snap-fastener portion for snap-fastening on a neck of the reservoir, wherein stiffener means for substantially preventing said deformable snap-fastener portion from deforming after snap-fastening are provided inside said deformable snap-fastener portion; and wherein the deformable snap-fastener portion comprises a lateral skirt of said fastener element, and a projection projecting radially inwards from an inside wall of said lateral skirt.

* * * * *